US011656945B2

(12) United States Patent
Kalamatianos et al.

(10) Patent No.: US 11,656,945 B2
(45) Date of Patent: May 23, 2023

(54) METHOD AND APPARATUS TO SUPPORT INSTRUCTION REPLAY FOR EXECUTING IDEMPOTENT CODE IN DEPENDENT PROCESSING IN MEMORY DEVICES

(71) Applicant: Advanced Micro Devices, Inc., Santa Clara, CA (US)

(72) Inventors: John Kalamatianos, Boxborough, MA (US); Nuwan Jayasena, Santa Clara, CA (US); Sudhanva Gurumurthi, Austin, TX (US); Shaizeen Aga, Santa Clara, CA (US); Shrikanth Ganapathy, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/133,843

(22) Filed: Dec. 24, 2020

(65) Prior Publication Data

US 2022/0206899 A1    Jun. 30, 2022

(51) Int. Cl.
*G06F 11/14*    (2006.01)
*G06F 9/38*    (2018.01)

(52) U.S. Cl.
CPC .......... *G06F 11/141* (2013.01); *G06F 9/3877* (2013.01)

(58) Field of Classification Search
CPC ............. G06F 11/1402; G06F 11/1405; G06F 11/1407; G06F 11/141; G06F 9/3877; G06F 15/7821
See application file for complete search history.

(56) References Cited

U.S. PATENT DOCUMENTS

| 5,572,662 | A | * | 11/1996 | Ohta | G06F 11/165 |
| | | | | | 714/E11.063 |
| 8,365,015 | B1 | * | 1/2013 | Yu | G06F 9/3863 |
| | | | | | 714/17 |
| 2002/0162050 | A1 | * | 10/2002 | Milojicic | G06F 11/141 |
| | | | | | 714/E11.116 |

(Continued)

FOREIGN PATENT DOCUMENTS

WO    WO-2012156995 A2 * 11/2012    ............. G06F 13/16

OTHER PUBLICATIONS

Smith et al., "Surviving Peripheral Failures in Embedded Systems", 2015, Proceedings of the 2015 USENIX Annual Technical Conference (USENIC ATC '15). All. (Year: 2015).*

(Continued)

*Primary Examiner* — Gabriel Chu
(74) *Attorney, Agent, or Firm* — Volpe Koenig

(57) ABSTRACT

Methods and processing devices are provided for error protection to support instruction replay for executing idempotent instructions at a processing in memory PIM device. The processing apparatus includes a PIM device configured to execute an idempotent instruction. The processing apparatus also includes a processor, in communication with the PIM device, configured to issue the idempotent instruction to the PIM device for execution at the PIM device and reissue the idempotent instruction to the PIM device when one of execution of the idempotent instruction at the PIM device results in an error and a predetermined latency period expires from when the idempotent instruction is issued.

20 Claims, 5 Drawing Sheets

(56) References Cited

U.S. PATENT DOCUMENTS

| | | | |
|---|---|---|---|
| 2006/0053331 A1* | 3/2006 | Chou | G06F 11/0793 |
| | | | 714/E11.054 |
| 2009/0164870 A1* | 6/2009 | Penton | G06F 11/1666 |
| | | | 714/764 |
| 2019/0018747 A1* | 1/2019 | Dong | G06F 11/3024 |
| 2020/0133803 A1* | 4/2020 | Kleeberger | G06F 11/1407 |

OTHER PUBLICATIONS

Menon, J., et. al., "iGPU: Exception Support and Speculative Execution on GPUs", 39th International Symposium an Computer Architecture, 12 pgs., 2012.

* cited by examiner

METHOD AND APPARATUS TO SUPPORT INSTRUCTION REPLAY FOR EXECUTING IDEMPOTENT CODE IN DEPENDENT PROCESSING IN MEMORY DEVICES

BACKGROUND

Reliability, availability and serviceability (RAS) are aspects of a system's design which affect the system's ability to operate continuously and the time incurred to service the system. Reliability typically refers to a system's ability to operate without failures (i.e., produce correct results) and maintain data integrity. The reliability of a system is enhanced by features that help to avoid, detect and repair errors occurring during the execution of programs by the system. Availability typically refers to the ability of the system to recover to an operational state after an error occurs, while serviceability typically refers to the time used to restore the state of a system following the error.

BRIEF DESCRIPTION OF THE DRAWINGS

A more detailed understanding can be had from the following description, given by way of example in conjunction with the accompanying drawings wherein.

DETAILED DESCRIPTION

Figure 1:
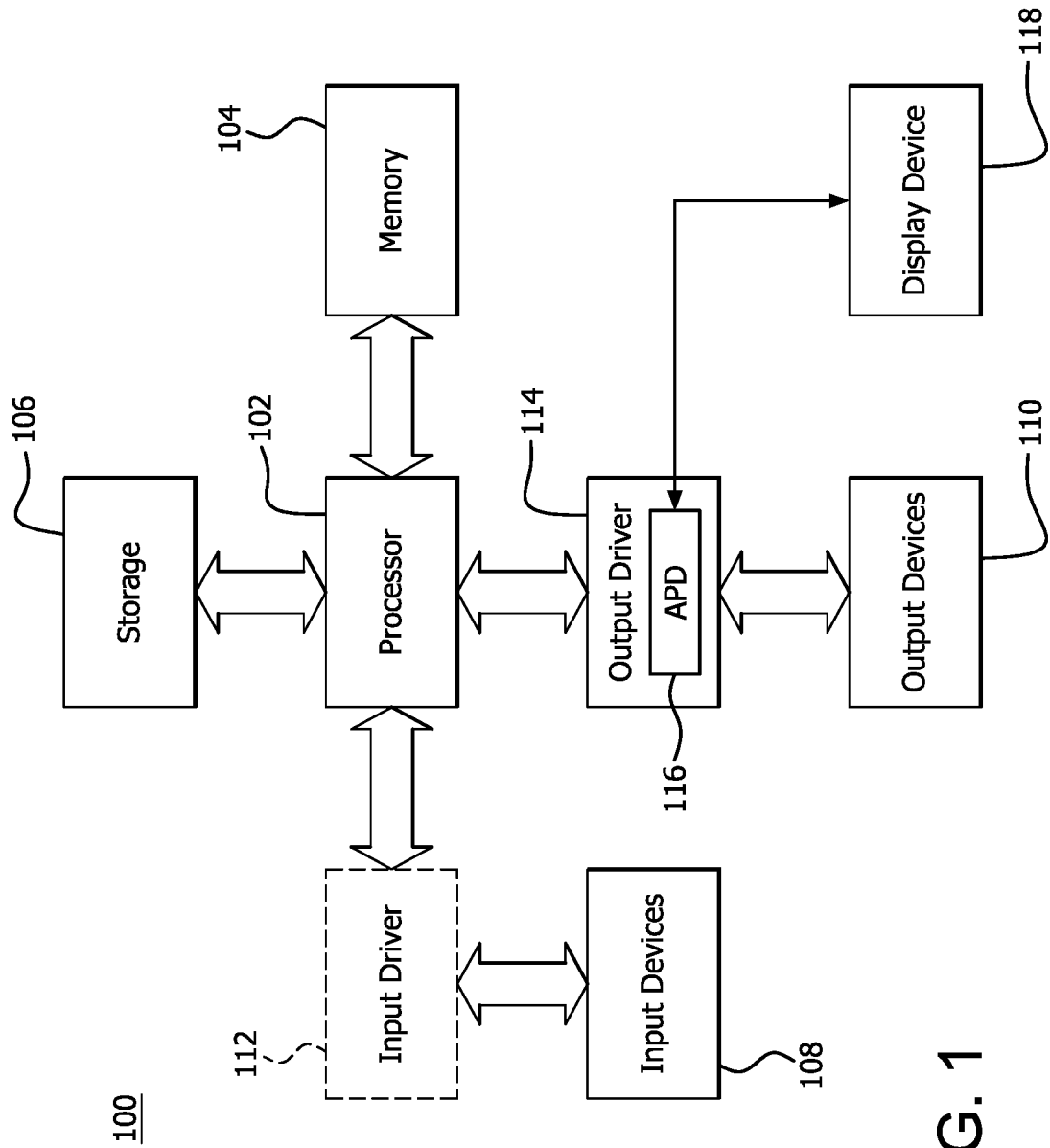
FIG. 1 is a block diagram of an example device in which one or more features of the disclosure can be implemented.

Processing-in-memory (PIM) is a computing paradigm in which instructions issued by a processor are executed inside memory devices using dedicated logic and data paths. In computing systems which do not include PIM enabled memory, a processor (e.g., CPU, GPU) executes instructions locally (e.g., via its own arithmetic processing units (ALUs)) after fetching data from main memory. In computing systems which do include PIM enabled memory, the processor executes some instructions locally, but also offloads some instructions to be executed at a PIM device. PIM devices are typically used to meet the RAS expectations or requirements for a specific use case or market.

Computing errors occur when the execution of one or more instructions results in incorrect data being stored for a machine state (e.g., in main memory, local memory, registers and the like). These errors include soft errors, which are intermittent in nature and result from the occurrence of events (e.g., particles hitting the memory) and hard errors, which result from a persistent physical defect of the system's hardware. While soft errors can be remedied by terminating and rebooting the system, this remedy is a very inefficient way of restoring the state of the system. Error protection techniques (e.g., error detection and correction) attempt to minimize the impact (e.g., latency) of soft errors occurring during the execution of a program or application.

Some programs or applications, (e.g., programs implementing machine learning algorithms) include an idempotent instruction or idempotent instruction sequence (i.e., group of instructions) to execute an idempotent operation which when re-executed, produce the same machine state as that of the initially executed idempotent instruction or idempotent instruction sequence. In contrast, an operation which increments a variable stored in memory is not an idempotent operation because the value of the variable changes each time the operation is replayed.

Conventional error detection systems include techniques for error protection of operations executed locally by the host processor. These conventional systems do not, however, include error protection techniques for errors resulting from idempotent operations issued by the processor and executing at a PIM device.

Conventional PIM systems often employ broadcasts of instructions to multiple memory devices to exploit parallelism and prevent significantly increasing the command bandwidth needs. Accordingly, some memory devices in these conventional systems may not provide indications, to the issuing processor, of errors resulting from execution of the instructions at the memory devices.

Features of the disclosure include apparatuses and methods for providing efficient error protection for an idempotent instruction or a sequence of idempotent instructions that are issued by a processor to be executed at a PIM device. Features of the disclosure exploit the characteristics associated with idempotent instructions to provide more efficient error protection by replaying (i.e., reissuing) idempotent instructions or sequences of instructions when an error results from the execution of the idempotent operations at the PIM device.

An error protection method is provided which comprises issuing, by a processor, an idempotent instruction, for execution at a PIM device and reissuing the idempotent instruction to the PIM device when one of execution of the idempotent instruction at the PIM device results in an error and a predetermined latency period expires from when the idempotent instruction is issued.

A processing apparatus is provided which comprises a PIM device, configured to execute an idempotent instruction and a processor, in communication with the PIM device. The processor is configured to issue the idempotent instruction to the PIM device for execution at the PIM device and reissue the idempotent instruction to the PIM device when one of execution of the idempotent instruction at the PIM device results in an error and a predetermined latency period expires from when the idempotent instruction is issued.

A non-transitory computer readable medium is provided which comprises instructions for causing a computer to execute an error protection method. The instructions comprise issuing, by a processor, an idempotent instruction, for execution at a PIM device and reissuing the idempotent instruction to the PIM device when one of execution of the idempotent instruction at the PIM device results in an error and a predetermined latency period expires from when the idempotent instruction is issued.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
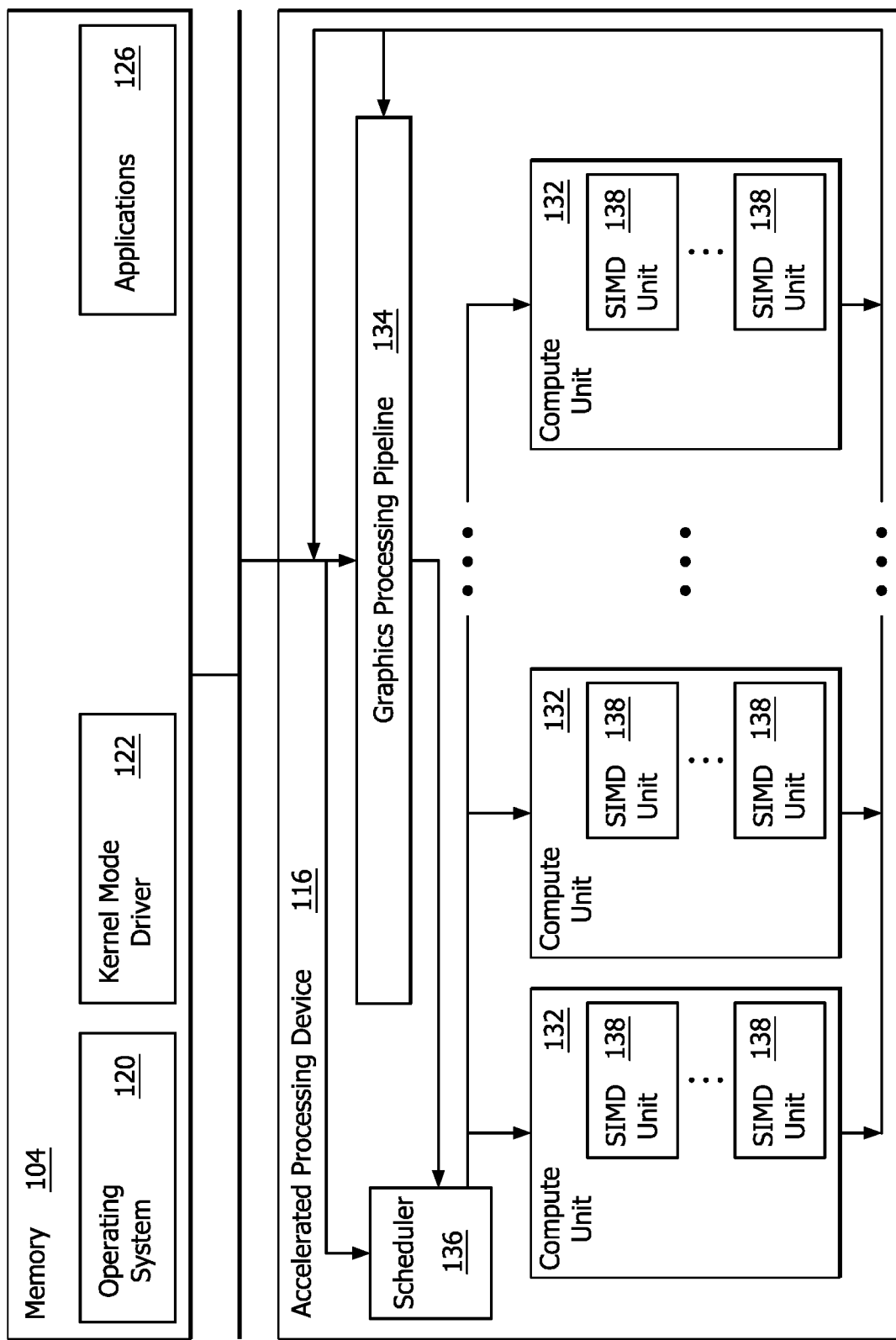
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

As described above, some programs or applications (e.g., programs implementing machine learning algorithms) include idempotent instructions. For example, instructions issued by a host processor (e.g., CPU or an accelerated processor, such as a GPU) to be executed at a PIM device typically include idempotent instructions.

Figure 3:
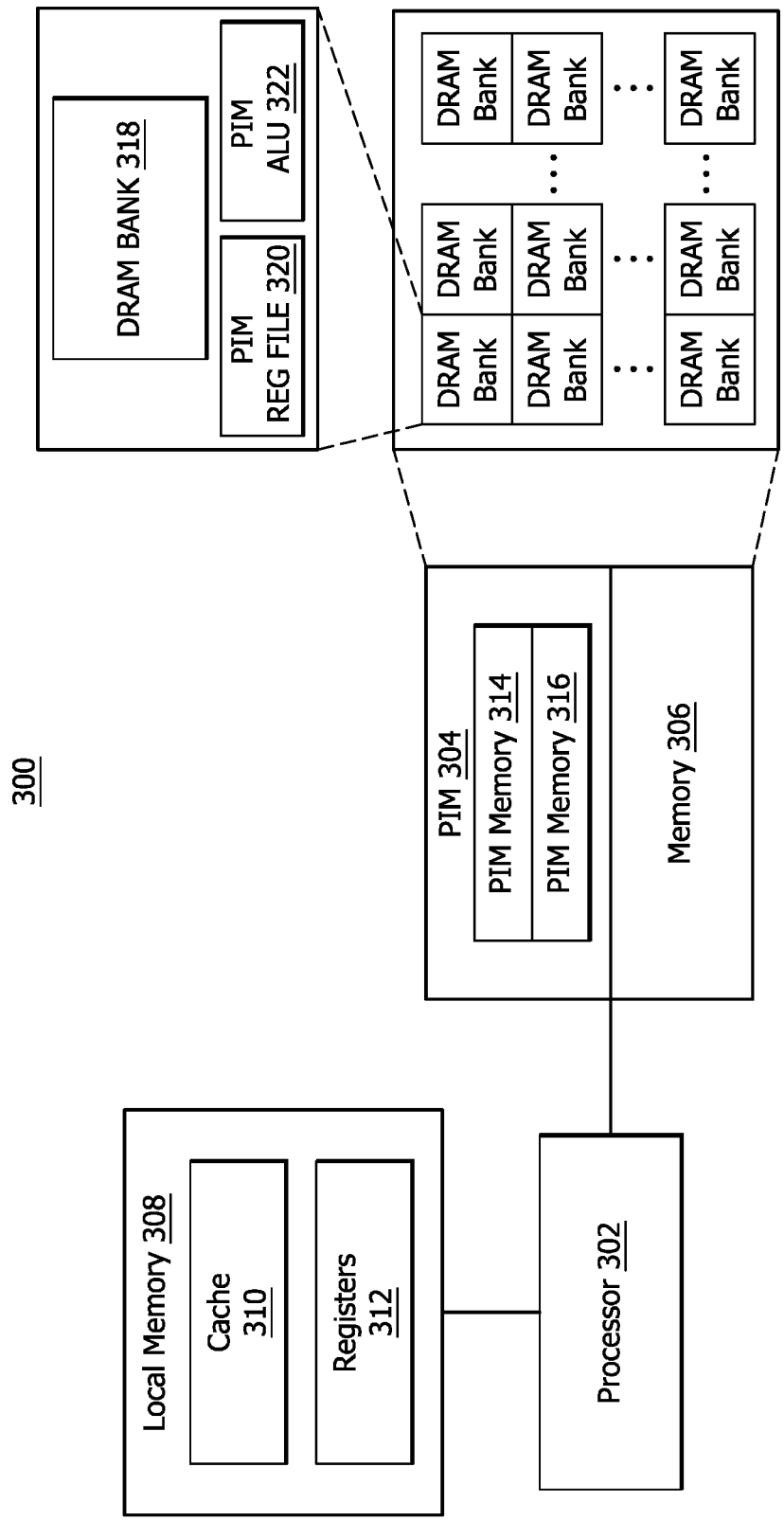
FIG. 3 is a block diagram illustrating exemplary components of a processing device in which one or more features of the disclosure can be implemented.

FIG. 3 is a block diagram illustrating exemplary components of a processing device 300 in which one or more features of the disclosure can be implemented. As shown in FIG. 3, the processing device 300 includes processor 302, PIM device 304 and PIM-enabled memory 306. Processing device 300 also includes local memory 308 (i.e., local to processor 302), which in turn includes cache 310 and registers 312. The PIM device 304 includes PIM memory 314 and PIM registers 316. The processing device 300 is merely an example of a fixed function PIM device 304 and its associated register file 320 (corresponding to PIM registers 316) and arithmetic logic unit (ALU) 322 on each DRAM bank 318 of memory 306 (e.g., main memory). Features of the present disclosure can be implemented using PIM devices having architectures, components and designs different from those shown in FIG. 3.

Processor 302 is in communication with PIM device 304 and memory 306 via a link (e.g., DRAM bus). Memory 306 is, for example, located on the same chip with the processor 302, located on a different chip than the processor 302, stacked in a separate die, located on top of the processor 302 (e.g., same chip but different level), or located on the same chip but on a different die (e.g. embedded DRAM).

Processor 302 is for example, a CPU or an accelerated processor (e.g., a GPU) or one or more processor cores. Processor 302 executes instruction locally (via local ALUs or SIMD units) utilizing local memory 308 and also issues instructions to be executed at the PIM device 304.

The processor 302 is configured to implement various functions to provide error protection for idempotent instructions executed at PIM device 304 as described in detail herein.

Idempotent instructions are, for example, organized into separate groups of instructions, each having identifiers, for identifying the beginning and end of an idempotent instruction group, which are recognized by the PIM device 304. The processor 302 temporarily stores the groups of instructions in local memory (e.g., cache, buffers, registers local to the processor) until the processor 302 receives an indication, from the PIM device 304, that an error was detected during execution of an idempotent group. Additionally or alternatively, the processor 302 receives an indication, from the PIM device 304, that execution of the instruction group is completed regardless of whether or not an error is detected. The error indication is generated at the PIM device 304 when an error is detected, but not corrected and provided to the processor.

One or both of the error indication and the completion indication are, for example, generated and provided to the processor 302 for each idempotent instruction issued to the PIM device 304. Alternatively, one or both of the error indication and completion indication are generated for a group of idempotent instructions issued to the PIM device 304. For example, the PIM device 304 generates one or both of these indications for an idempotent instruction group when the PIM device 304 recognizes an identifier which identifies the beginning of the idempotent instruction group. Additionally, the PIM device 304 is, for example, configured to disable one or both of these indications when the PIM device 304 recognizes an identifier which identifies the end of the idempotent instruction group. The identifiers can also be used to differentiate between idempotent instructions and non-idempotent instructions issued to the PIM device 304.

Features of the present disclosure include identifying idempotent instructions via software, (e.g., when compiled), hardware (e.g., at the host processor) or a combination of software and hardware.

Replaying (i.e., reissuing) the instructions at the PIM device 304 also facilitates the determination of both intermittent and persistent errors. For example, the processor replays an idempotent instruction (e.g., due to receiving an indication from the PIM device 304 that the execution of the idempotent instruction resulted in an error), or a group of idempotent instructions, at the PIM device. When the replayed idempotent instruction, or the replayed group of idempotent instructions, does not result in an error (e.g., due to receiving an indication from the PIM device 304), the processor 302 determines that the error resulting from the first execution of the idempotent instruction is intermittent and flushes the idempotent instruction or group of instructions from local memory.

When the replayed idempotent instruction (or the replayed group of idempotent instructions) executed at the PIM device 304 results in an error, the processor 302 determines that the error is persistent and takes an appropriate action (e.g., issues one or more additional instructions) to maintain serviceability (e.g., restore the state to a previous state before the error), such as for example, terminating the application, repairing PIM device 304 or deactivating the PIM device 304. Alternatively, instead of the processor 302 determining that an error is persistent after a single replay, the processor 302 determines, for example, that an error is persistent after replaying the instruction or group of instructions for a predetermined number of times and receiving an indication from the PIM device 304 that the same idempotent instruction or group of instructions results in an error. For example, the additional number of error indications is compared to an error threshold number and when the additional number of error indications is equal to or greater than error threshold number, the processor 302 determines that the error is persistent and takes similar actions to maintain serviceability.

A reason for determining whether a fault is intermittent or persistent is for serviceability. If the error is intermittent, the PIM device 304 can be continued to be used because it assumed that that the error is a rare event and the PIM device 304 is otherwise functional. If fault is persistent, different operations can be performed to maintain serviceability, such as initiating an in-field repair, swapping out the smallest field replaceable unit that includes the PIM device 304, disabling the PIM device 304 (e.g., if the error is determined to be caused by the compute engines, in contrast to the error being due to the memory itself).

Additionally or alternatively, determination of whether or not to replay an idempotent instruction is, for example, controlled based on a received status indication (e.g., status code) of a type of error resulting from the execution of the idempotent instruction. That is, the processor 302 can conditionally determine whether or not to replay instructions when the PIM device 304 provides, to the processor 302, a status indication of the type of resulting error (e.g., divide by zero, wrong data in PIM register 316, wrong destination value generated by PIM logic (not shown)). For example, when the PIM device 304 provides a divide by zero status indication, the processor 302 determines not to replay the idempotent instruction. Alternatively, the processor 302 can determine to replay the idempotent instruction when a different error status indication is received by the processor 302. For example, when the error status provided by the PIM device 304 indicates that the error was detected while updating one of the PIM registers 316, the processor 302 determines to replay the idempotent instruction. Additionally, when the same error status indication is received by the processor 302 for an additional predetermined number of replays of the idempotent instruction, however, the processor instructs, for example, that PIM register 316 be disabled from executing further PIM operations.

The processor 302 can, for example, stop issuing subsequent instructions to the PIM device after a group of idempotent instructions have been issued until the completion and/or error indications for it is received. Alternatively, the processor 302 continues issuing instructions to the PIM device 304 without waiting for an error indication. For example, processor 302 issues instructions to the PIM device 304 in a FIFO order using a first pointer (e.g., an issue pointer) that points to the next instruction to issue and a second pointer (e.g., a retire pointer) that points to the next instruction to be flushed (e.g., removed, deallocated) from local memory 308 (e.g., buffer).

When error indications are provided to the processor 302 per individual idempotent instruction, the processor 302 maintains each idempotent instruction in local memory (e.g., buffer memory) 308 until a predetermined latency period expires (e.g., time period or number of clock cycles from when the instruction was issued by the processor 302). For example, when the latency period expires and an error results from the execution of the idempotent instruction, the PIM device 304 provides the error indication to the processor 302 and the processor reissues the instruction pointed by the retire pointer to the PIM device 304. If the PIM device 304 does not provide the error indication to the processor 302, the entry for the instruction in local memory 308 is flushed (e.g., deallocated) by advancing the retire pointer.

Maintaining idempotent instructions in local memory 308 until a predetermined latency period expires facilitates effective command bandwidth utilization and improves performance. Processor 302 can also be configured to implement error protection in two modes to provide support for idempotent computation replay and relaxed tracking for non-idempotent computations. In the first mode, the processor 302 tracks instructions (e.g., maintains instructions in local memory 308) until the predetermined latency period expires. In the second mode, the processor 302 does not track the instructions in local memory 308. Selection of which mode to use is, for example, facilitated at the application-level (e.g., the application provides an indication of which mode would be more efficient for error protection).

Additionally or alternatively, when completion indications are provided to the processor 302 per individual idempotent instruction, the receipt of a completion indication is used to determine instruction completion instead of the predetermined latency period.

When error indications are provided to the processor 302 per group of idempotent instructions, the processor maintains each issued instruction for an idempotent instructions group in local memory 308 until a predetermined latency period expires (e.g., time period or number of clock cycles from when the last instruction in the group is issued by the processor 302). When the predetermined latency period expires and no error detection signal is received, the instructions in the group are flushed (e.g., deallocated) from local memory 308.

Each instruction in local memory 308 is, for example, tagged with a unique group ID. Group IDs are assigned to the instructions issued to PIM and are recycled by the processor 302. When the predetermined latency period expires and the error signal is not provided to the processor 302, each instruction matching the group ID is flushed from local memory 308. The retire pointer advances to the first instruction of the next group to be issued to the PIM device 304. When the error signal is provided to the processor 302, the issue pointer is set to point to the first instruction of the group matching the group ID and the processor 302 replays each instruction in the same group ID. When instructions from the group ID N+1 (or later) have been issued when the predetermined latency period expires for the instructions of group N and a replay has been issued, the instructions of group ID N+1 are also replayed.

Additionally or alternatively, when completion indications are provided to the processor 302 per group of idempotent instruction, the receipt of a completion indication is used to determine instruction completion of a group instead of the predetermined latency period.

When for example, multiple idempotent groups are issued concurrently (in parallel), the processor communicates the unique identifier of each group to the PIM device 304 as they are issued. Subsequent completion and/or error indication from the PIM device 304 to the processor 302 includes the group identifiers such that the processor 302 can associate the information with the appropriate group.

When the unique group identifier is provided to the PIM device 304, the processor 302 can also, for example, generate multiple groups of idempotent instructions independent of each other, when application-level dependencies allow. Dependencies are, for example, memory address-based or register-based (PIM registers whose state persists across groups of PIM instructions). When multiple idempotent groups are issued concurrently, completion and/or error indication from the PIM device 304 to the processor 302 includes the group identifier such that that processor 302 can associate the information with the appropriate group and avoid replaying instructions from subsequent, independent groups of idempotent computations. Dependencies between groups of idempotent instructions are, for example, communicated to the processor 302 via markers attached to the last instruction of each group that are set when any subsequent group has a dependency and reset when there is no such dependency. The markers are set, for example, via in software (e.g. compiler), hardware or a combination of software and hardware.

When instructions for a group are maintained until the completion of the group occurs, and a portion of local memory 308 allocated for the instructions is not large enough to store an instruction group, the processor 302 issues (e.g., using a single bit) a request for checkpoint (RFC) when the processor 302 detects that its allocated portion of local memory 308 is about to be full and the end of group instruction has not been seen yet. The RFC, provided along with the issued instruction to the PIM device 304, marks when the checkpoint should be serviced. Upon detecting a RFC, the PIM device 304 checkpoints PIM device registers 316 to a DRAM row assigned as a temporary buffer. In the event of an uncorrected, detected error, instruction replay will resume when the PIM device 304 has reinstated the register values from the last checkpoint. A single checkpoint is created and restored per group of instructions at any point in time. The PIM device 304 does not use a checkpoint when the instruction marking the start of a group is determined by the PIM device 304.

The processor 302 replays instructions, for example, issued to each portions of the PIM device 304 in a broadcast fashion. Alternatively, processor 302 broadcasts the instructions to be replayed to portions of the PIM device 304 which indicate errors resulting from execution of the instruction at the portions of the PIM device 304.

Figure 4:
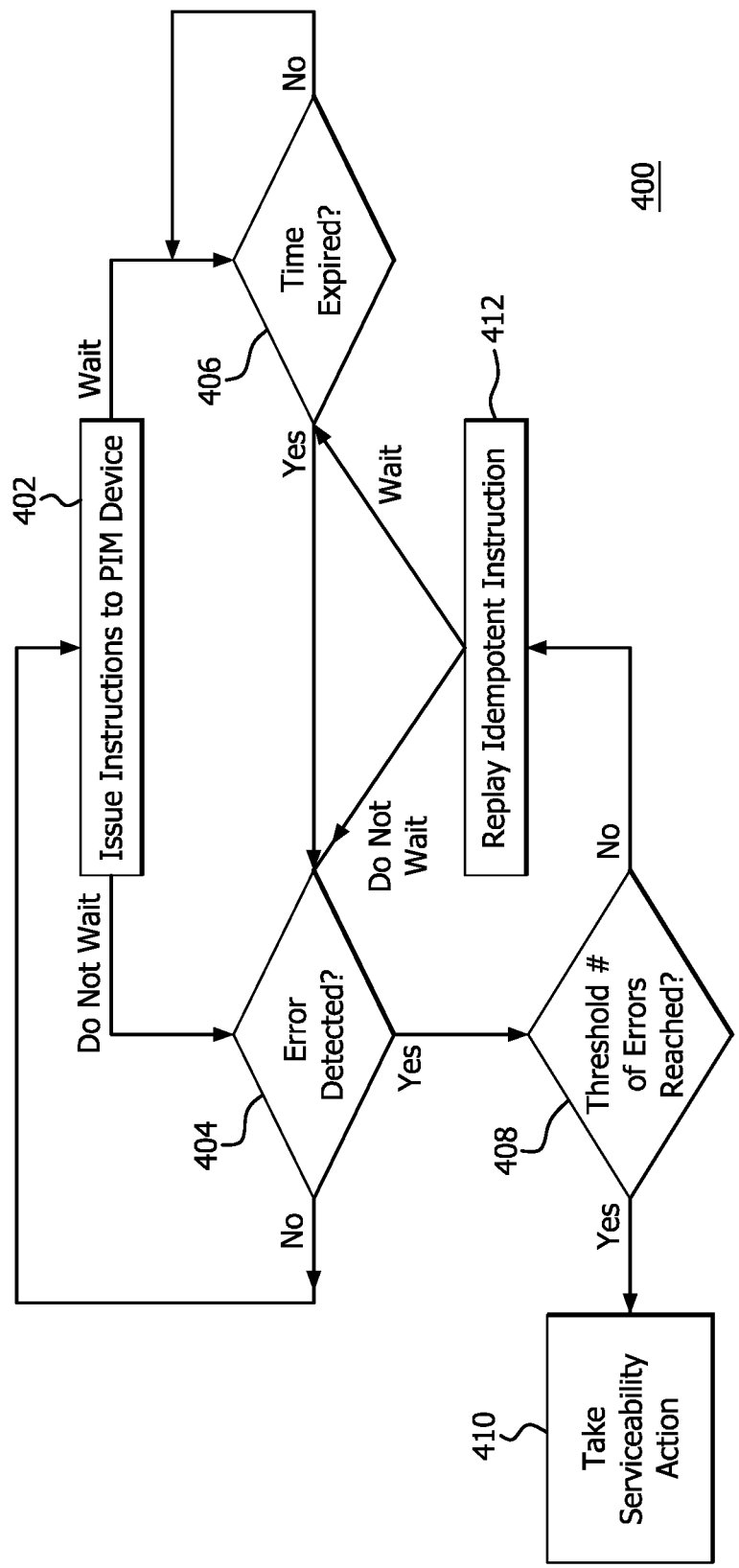
FIG. 4 is a flow diagram illustrating an example error protection method according to features of the disclosure.

FIG. 4 is a flow diagram 400 illustrating an example error protection method according to features of the disclosure.

As shown at block 402 of FIG. 4, the method 400 includes issuing (e.g., by processor 302) instructions to be executed at a PIM device (e.g., PIM device 304), including one or more idempotent instructions, which when executed multiple times (i.e., re-executed), produce the same machine state as that of the initially executed idempotent instruction or group of instructions.

The idempotent instructions are, for example, organized into separate groups of instructions, each having identifiers, for identifying the beginning and end of an idempotent instruction group, which are recognized by the PIM device. The groups of instructions are temporarily stored in local memory (e.g., cache, buffers, registers local to a host processor issuing the instructions) until an indication is received from the PIM device that an error was detected during execution of one or more idempotent operations of an instruction group. Additionally or alternatively, an indication is received that execution of the instruction group is completed regardless of whether or not an error is detected.

Figure 5:
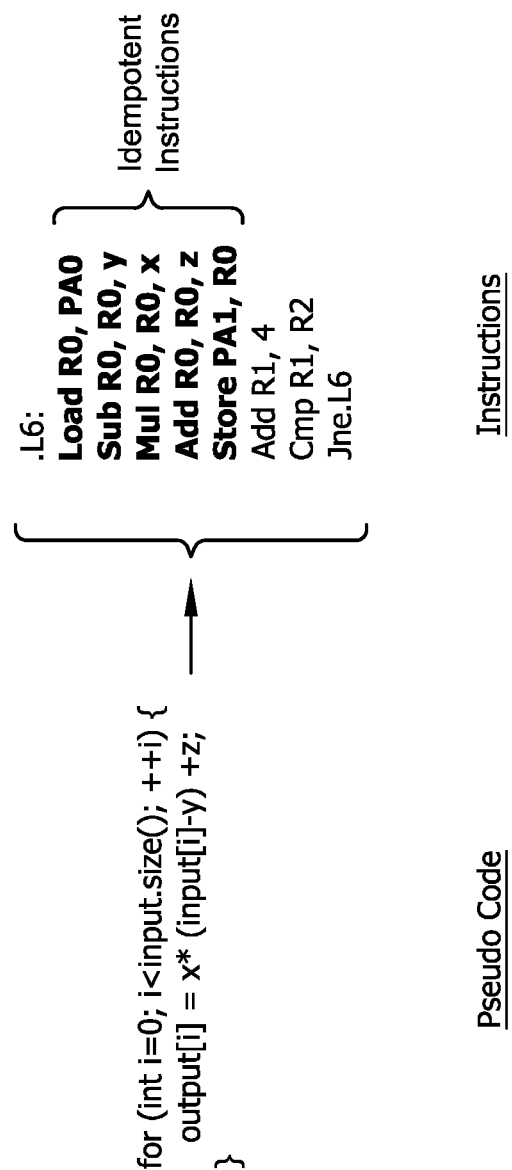
FIG. 5 is an example of pseudo code and an idempotent group of instructions which can be used to implement features of the disclosure.

An example of an idempotent group of instructions is the batch normalization kernel used in various machine learning algorithms for both training and inference. The pseudo code of the kernel is shown on the left side of FIG. 5 and the corresponding instructions are shown on the right side of FIG. 5. The instructions issued to the PIM device consist of all instructions starting from the load and ending with the store instruction. The remaining instructions execute at the processor 302. PA0 and PA1 represent physical memory addresses being read and written respectively. R0 is a PIM register used in computations while x, y and z are values, participating in the computations, provided by the processor 302 to the PIM device 304. The group of instructions issued to the PIM device 304 is also marked as idempotent as shown on the right side of FIG. 5. The group of instructions is idempotent because the machine state (memory, PIM registers) will not change if the entire group is replayed in the PIM device 304 by the processor 302.

If an error occurs when the instructions are executed by the PIM device 304, the PIM device 304 notifies the processor 302, which has previously determined that a sequence of instructions is idempotent, and flushes the remaining instructions from the same sequence. Processor 302, upon receiving the error indication from the PIM device 304, stops issuing new instructions and replay the idempotent instruction sequence. Memory and PIM registers can be overwritten by replaying the idempotent instruction sequence. Accordingly, the machine state and, therefore, the result of the stored computation is the same.

As shown at decision block 404 of FIG. 4, the method 400 includes determining whether or not execution of an idempotent instruction at the PIM device results in an error or execution of the idempotent instruction at the PIM device is completed. For example, idempotent instructions are temporarily stored, by the issuing processor, in local memory and the processor receives at least one of a first indication that execution of an idempotent instruction at the PIM device results in an error and a second indication that execution of the idempotent instruction at the PIM device is completed. When it is determined (e.g., via an indication from the PIM device) that either no error resulted from the execution of an idempotent instruction at the PIM device or that execution of the idempotent instruction at the PIM device is completed ("No" decision), the idempotent instruction is flushed from local memory and the method 400 proceeds to issuing the next instruction in block 402.

When it is determined that an error resulted from the execution of an idempotent instruction ("Yes" decision), at the PIM device, the idempotent instruction (or idempotent instruction group) is maintained in local memory and the method 400 proceeds to block 408. As shown at decision block 408, a determination is made as to whether a number of indicated errors is equal to or greater than a threshold number of indicated errors. When the number of indicated errors is equal to or greater than a threshold number of indicated errors ("Yes" decision) the error is determined to be persistent and the processor issues one or more additional instructions to maintain serviceability at block 410. When the number of indicated errors is not equal to or greater than a threshold number of indicated errors ("No" decision) the idempotent instruction (or group of instructions) is replayed at block 412.

Additionally or alternatively, the idempotent instruction (or idempotent instruction group) is maintained in local memory (e.g., buffer memory) until the expiration of a predetermined latency period (e.g., time period or number of clock cycles from when the instruction is issued by the processor to when the error indication is received by the processor), as indicated by the "Wait" arrow from block 402 to decision block 406. For example, as shown at decision block 406 of FIG. 4, the method 400 includes determining whether a predetermined latency period has expired. When it is determined that the predetermined latency period has not expired (NO decision), the method 400 includes continuing to wait for the predetermined latency period to expire.

When the method 400 includes using the error and completion indications and it is determined that the predetermined latency period has expired (YES decision), the method 400 proceeds to decision block 404 to determine whether or not an error during the execution of the idempotent instruction (or idempotent instruction group) has been communicated by the PIM device 304. The method then proceeds as described above.

When error indications are provided to the processor per individual idempotent instruction, for example, when the latency period expires and an error results from the execution of the idempotent instruction (or idempotent instruction group), the PIM device 304 provides the error indication to the processor 302 and the processor reissues the instruction pointed by the retire pointer to the PIM device 304. If the PIM device 304 does not provide the error indication to the processor 302, the entry for the instruction in local memory 308 is flushed (e.g., deallocated) by advancing the retire pointer.

After the idempotent instruction (or idempotent instruction group) is replayed at block 412, the method 400 proceeds with either proceeding to decision block 404 without waiting for a predetermined latency period to expire, (as indicated by the Do Not Wait arrow from block 412 to decision block 404) or alternatively, waiting until the predetermined latency period expires (as indicated by the "Wait" arrow from block 412 to decision block 406) and then proceeding to decision block 404, where the process described above is repeated for the replayed instruction. For example, after the idempotent instruction (or idempotent instruction group) is replayed at block 412 and the method has proceeded directly to decision block 404 or to decision block 406 and then decision block 404, when it is determined that either no error resulted from the execution of the replayed instruction or that execution of the replayed instruction is completed, the replayed instruction is flushed from local memory and the method 400 proceeds back to block 402.

When it is determined that an error resulted from the execution of the replayed instruction, the idempotent instruction is maintained in local memory and the method 400 proceeds to decision block 408 to determine whether or not the idempotent instruction should be replayed again. For example, as shown at decision block 408, the method 400 includes determining when an additional number of indications are received (e.g., from the PIM device) that the re-executed idempotent instruction (or idempotent instruction group) results in an error. The additional number of error indications is, for example, compared to an error threshold number. When the additional number of error indications is equal to or greater than the error threshold number, the idempotent instruction (or idempotent instruction group) is flushed from local memory and the method 400 proceeds to block 410 where the processor issues one or more additional instructions to service the error. When the additional number of error indications is not equal to or greater than the error threshold number, the method 400 proceeds back to block 412 and the idempotent instruction (or idempotent instruction group) is replayed an additional time.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, 302, the input driver 112, the input devices 108, the output driver 114, the output devices 110, the accelerated processing device 116, the scheduler 136, the graphics processing pipeline 134, the compute units 132, the SIMD units 138, and PIM device 304 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An error protection method comprising:
issuing, by a processor, an idempotent instruction, for execution at a processing in memory (PIM) device;
maintaining the idempotent instruction in local memory until a predetermined latency period expires from when the idempotent instruction is issued; and
in response to execution of the idempotent instruction at the PIM device resulting in an error and the predetermined latency period expiring, reissuing the idempotent instruction to the PIM device.

2. The method of claim 1, further comprising:
flushing the idempotent instruction from local memory when the predetermined latency period expires and no error indication is received from the PIM device.

3. The method of claim 1, further comprising:
issuing a group of idempotent instructions, via an identifier which identifies the group of idempotent instructions; and
reissuing the group of idempotent instructions to the PIM device when execution of the group of idempotent instructions at the PIM device result in an error.

4. The method of claim 3, further comprising:
maintaining the group of idempotent instructions in local memory until:
an expiration of a predetermined latency period from when a last instruction in the group of idempotent instructions is issued and no error indication is received; and
an error indication is received for the execution of the group of idempotent instructions.

5. The method of claim 1, further comprising:
temporarily storing the idempotent instruction in local memory;
receiving at least one of:
a first indication that execution of the idempotent instruction at the PIM device results in an error; and
a second indication that execution of the idempotent instruction at the PIM device is completed; and
flushing the idempotent instruction from local memory when the first indication is received.

6. The method of claim 5, further comprising stopping issuing additional instructions to the PIM device until the at least one of the first indication and the second indication is received.

7. The method of claim 5, further comprising:
after issuing the idempotent instruction, issuing additional instructions to the PIM device in a FIFO order; and maintaining a first pointer which points to a next one of the additional instructions to be issued and a second pointer which points to a next instruction to be flushed from the local memory.

8. The method of claim 1, further comprising:
receiving at least one of:
  a first indication that a re-executed idempotent instruction does not result in an error; and
  a second indication that the re-executed idempotent instruction does result in an error; and
when the first indication is received, determining that the error is intermittent and flushing the idempotent instruction from local memory; and
when the second indication is received, determining that the error is persistent and issuing at least one additional instruction to maintain serviceability.

9. The method of claim 8, further comprising:
when the second indication is received, reissuing the idempotent instruction to be re-executed at the PIM device; and
when an additional number of indications are received that re-execution of the idempotent instruction does result in an error, determining that the error is persistent and issuing the at least one additional instruction to maintain serviceability.

10. The method of claim 1, further comprising:
receiving a status indication of a type of error resulting from the execution of the idempotent instruction at the PIM device; and
determining whether or not to replay the idempotent instruction based on the status indication.

11. A processing apparatus comprising:
a processing in memory (PIM) device configured to execute an idempotent instruction; and
a processor, in communication with the PIM device, the processor configured to:
  issue the idempotent instruction to the PIM device for execution at the PIM device;
  maintain the idempotent instruction in local memory until a predetermined latency period expires from when the idempotent instruction is issued; and
  in response to execution of the idempotent instruction at the PIM device resulting in an error and the predetermined latency period expiring, reissuing the idempotent instruction to the PIM device.

12. The processing apparatus according to claim 11, wherein the processor is configured to:
flush the idempotent instruction from local memory when the predetermined latency period expires and no error indication is received from the PIM device.

13. The processing apparatus according to claim 11, wherein the processor is configured to:
issue a group of idempotent instructions via an identifier which identifies the group of idempotent instructions; and
reissue the group of idempotent instructions to the PIM device when execution of the group of idempotent instructions at the PIM device does result in an error.

14. The processing apparatus of claim 13, wherein the processor is configured to maintain the group of idempotent instructions in local memory until:
an expiration of a predetermined latency period from when a last instruction in the group of idempotent instructions is issued and no error indication is received from the PIM device; and
an error indication is received for the execution of the group of idempotent instructions.

15. The processing apparatus of claim 11, wherein the processor is configured to:
temporarily store the idempotent instruction in local memory;
receive at least one of:
  a first indication that execution of the idempotent instruction at the PIM device does result in an error; and
  a second indication that execution of the idempotent instruction at the PIM device is completed; and
flush the idempotent instruction from local memory when the first indication is received.

16. The processing apparatus of claim 15, wherein the processor is configured to:
stop issuing additional instructions to the PIM device until the at least one of the first indication and the second indication is received.

17. The processing apparatus of claim 15, wherein after issuing the idempotent instruction, the processor is configured to:
issue additional instructions to the PIM device in a FIFO order; and
maintain a first pointer which points to a next one of the additional instructions to be issued and a second pointer which points to a next instruction to be flushed from the local memory.

18. The processing apparatus of claim 11, wherein the processor is configured to:
receive at least one of:
  a first indication that a re-executed idempotent instruction does not result in an error; and
  a second indication that the re-executed idempotent instruction does result in an error; and
when the first indication is received, determine that the error is intermittent and flush the idempotent instruction from local memory; and
when the second indication is received, determine that the error is persistent and issue at least one additional instruction to maintain serviceability.

19. The processing apparatus of claim 18, wherein the processor is configured to:
reissue the idempotent instruction to the PIM device when the second indication is received; and
determine that the error is persistent and issue at least one additional instruction to maintain serviceability when an additional number of indications are received that re-execution of the idempotent instruction does result in an error.

20. A non-transitory computer readable medium comprising instructions for causing a computer to execute an error protection method comprising:
issuing, by a processor, an idempotent instruction, for execution at a processing in memory (PIM) device;
maintaining the idempotent instruction in local memory until a predetermined latency period expires from when the idempotent instruction is issued; and
in response to execution of the idempotent instruction at the PIM device resulting in an error and the predetermined latency period expiring, reissuing the idempotent instruction to the PIM device.

* * * * *